(12) United States Patent
Pisklak et al.

(10) Patent No.: US 12,247,159 B1
(45) Date of Patent: Mar. 11, 2025

(54) BIODERIVED RENEWABLE GRAPHENE ENHANCED CEMENT

(71) Applicant: Halliburton Energy Services, Inc., Houston, TX (US)

(72) Inventors: Thomas Jason Pisklak, Houston, TX (US); Kyriacos Agapiou, Houston, TX (US); Samuel J. Lewis, Houston, TX (US); Chad Huffman, Calgary (CA); Giorgio DeVera, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/367,145

(22) Filed: Sep. 12, 2023

(51) Int. Cl.
*C09K 8/467* (2006.01)
*C04B 14/02* (2006.01)
*C04B 28/04* (2006.01)
*C04B 28/06* (2006.01)
*E21B 33/138* (2006.01)

(52) U.S. Cl.
CPC ............ *C09K 8/467* (2013.01); *C04B 14/022* (2013.01); *C04B 28/04* (2013.01); *C04B 28/06* (2013.01); *E21B 33/138* (2013.01); *C04B 2201/50* (2013.01)

(58) Field of Classification Search
None
See application file for complete search history.

(56) References Cited

U.S. PATENT DOCUMENTS

| 11,739,247 | B1 | 8/2023 | Boul |
| 2012/0015852 | A1 | 1/2012 | Quintero et al. |

(Continued)

FOREIGN PATENT DOCUMENTS

| CN | 104891479 A | 5/2015 |
| CN | 109133806 A | 1/2019 |

(Continued)

OTHER PUBLICATIONS

Filing Receipt, Specification and Drawings for U.S. Appl. No. 17/892,775, filed Aug. 22, 2022, entitled "Graphene Fluid Utilized to Suspend Particulates," 46 pages.

(Continued)

*Primary Examiner* — Anuradha Ahuja
(74) *Attorney, Agent, or Firm* — Conley Rose, P.C.; Rodney B. Carroll (57) ABSTRACT

A hardened cement produced by setting a cement slurry including graphene comprising bioderived renewable graphene (BRG), a cement, and water. The graphene of the cement slurry comprises, consists essentially of, or consists of BRG, and the cement slurry comprises at least 0.2 (e.g., from about 0.2 to about 20) percent graphene comprising BRG by weight of cement (% graphene bwoc). The hardened cement produced by allowing the cement slurry to set has one or more enhanced mechanical properties (e.g., increased Young's modulus (YM), increased compressive strength (CS), or increased resiliency as indicated by an increased reduction in a ratio of YM/CS) relative to a same hardened cement produced by allowing to set a same cement slurry comprising a same total amount of graphene, with synthetic graphene (SG) in place of at least a portion of the BRG. Methods of cementing with the cement slurry are also provided.

20 Claims, 4 Drawing Sheets

(56) References Cited

U.S. PATENT DOCUMENTS

| | | | |
|---|---|---|---|
| 2012/0245058 A1 | 9/2012 | Monteiro et al. | |
| 2013/0341028 A1 | 12/2013 | Christian et al. | |
| 2014/0134092 A1 | 5/2014 | Shankman | |
| 2015/0108391 A1 | 4/2015 | Tour et al. | |
| 2015/0152314 A1* | 6/2015 | Muthusamy | C04B 28/02 106/781 |
| 2015/0275067 A1 | 10/2015 | Kabbani et al. | |
| 2017/0327729 A1 | 11/2017 | Salla et al. | |
| 2018/0282214 A1* | 10/2018 | Xiang | C04B 28/006 |
| 2019/0144280 A1 | 5/2019 | Opoku | |
| 2020/0056086 A1 | 2/2020 | Ha et al. | |
| 2020/0308469 A1* | 10/2020 | Taleghani | C04B 28/02 |
| 2021/0061661 A1 | 3/2021 | Opoku | |
| 2021/0238040 A1 | 8/2021 | Opoku et al. | |
| 2022/0234955 A1 | 7/2022 | Masotti | |
| 2023/0279283 A1 | 7/2023 | Pang et al. | |
| 2024/0059608 A1* | 2/2024 | Lewis | C04B 40/0046 |
| 2024/0059952 A1* | 2/2024 | Pisklak | C04B 40/0039 |
| 2024/0059953 A1* | 2/2024 | Pisklak | C09K 8/467 |
| 2024/0059955 A1* | 2/2024 | Pisklak | C01B 32/182 |
| 2024/0247178 A1* | 7/2024 | Pisklak | C09K 8/467 |

FOREIGN PATENT DOCUMENTS

| | | | | |
|---|---|---|---|---|
| WO | 2015084438 A1 | | 6/2015 | |
| WO | 2021076667 A1 | | 4/2021 | |
| WO | WO 2021076667 | * | 4/2021 | C04B 7/02 |
| WO | 2023168263 A1 | | 9/2023 | |

OTHER PUBLICATIONS

Filing Receipt, Specification and Drawings for U.S. Appl. No. 17/892,781, filed Aug. 22, 2022, entitled "Use of Graphene as a Cement Retarder," 43 pages.

Filing Receipt, Specification and Drawings for U.S. Appl. No. 17/892,787, filed Aug. 22, 2022, entitled "Mitigation of Transient Gels in Cements," 41 pages.

Filing Receipt, Specification and Drawings for U.S. Appl. No. 17/892,790, filed Aug. 22, 2022, entitled "Use of Graphene to Enhance Stability and Density Control of Cement Slurriess," 40 pages.

Final Office Action dated Sep. 21, 2023 (23 pages), U.S. Appl. No. 17/892,787, filed Aug. 22, 2022.

Ikram, Rabia et al., "Utilization of eco-friendly waste generated nanomaterials in water-based drilling fluids; state of the art review", Materials, Jul. 27, 2021 (Publication date), vol. 14, Article No. 4171, Internal pp. 1-28.

Foreign Communication from Related Application—International Search Report and Written Opinion of the International Searching Authority, International Application No. PCT/US2023/023475, dated Sep. 12, 2023, 9 pages, abstract tables; 1, 2.

Foreign Communication from Related Application—International Search Report and Written Opinion of the International Searching Authority, International Application No. PCT/US2023/024519, dated Aug. 22, 2023, 9 pages. Sep. 25, 2023.

Zhi Ge et al., "The Effect of the Addition of Graphene Nanoplatelets on the Selected Properties of Cementitious Composites", Frontiers in Built Environment, pp. 1-10 2021, vol. 7, Article No. 673346.

Rhee, I. et al., "Compressive Strength Sensitivity of Cement Mortar Using Rice Husk-Derived Graphene With a High Specific Surface Area", Construction and Building Materials, 2015, vol. 96, pp. 189-197.

Alkhamis, M. et al., "New Cement Formulations Utilizing Graphene Nano Platelets to Improve CementProperties and Long-Term Reliability in Oil Wells", SPE Kingdom of Saudi Technical Symposium and Exhibition, 2018, SPE-192342-MS, pp. 1-17.

Foreign Communication from Related Application—International Search Report and Written Opinion of the International Searching Authority, International Application No. PCT/US2023/023473, dated Sep. 12, 2023, 10 pages.

Foreign Communication from Related Application—International Search Report and Written Opinion of the International Searching Authority, International Application No. PCT/US2023/024521, dated Sep. 19, 2023, 9 pages.

* cited by examiner

BIODERIVED RENEWABLE GRAPHENE ENHANCED CEMENT

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally cements. More specifically, the present disclosure relates to graphene enhanced cements. Still more specifically, the present disclosure relates to cements comprising bioderived renewable graphene (BRG) that, when set, provide enhanced mechanical properties relative to set cements comprising synthetic graphene, thus making them useful as oilwell cements.

BACKGROUND

Effective zonal isolation of wellbores requires cement sheaths which are highly resilient and capable of withstanding repeated stresses. However, typical Portland cements can have high compressive strengths (CSs) and concomitantly high Young's moduli (YM). These cements can be strong, but brittle, with insufficient resiliency over the life of the well. It may thus be desirable to have a cement with a relatively high compressive strength and a relatively low Young's modulus.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, the phrase "percent by weight of water", abbreviated "% bwow", indicates the amount of additive material divided by the weight of water multiplied by 100 and the phrase, "percent by weight of the composition" or "percent by weight of cement", abbreviated "% bwoc", indicates the amount of additive material divided by the weight of cementitious material multiplied by 100.

As utilized herein, bioderived renewable graphene (BRG) is a biorenewable resource. As utilized herein, graphene produced (e.g., derived) from any type of biomass, biomass waste, or other "green", renewable, and/or sustainable feedstocks can be considered BRG. Biomass is an organic material that normally comes from plants or animals and which (along with BRG produced or derived therefrom) can be considered sustainable material.

As noted above, resilient cements can be characterized by a relatively high compressive strength (CS) and low Young's modulus (YM). Conventionally, the lack of resiliency provided by typical Portland cements has been addressed via the use of additives. However, along with the desired changes in cement resiliency (e.g., reduced YM), such additives can also result in undesired concomitant reductions in CS. Furthermore, large amounts of these conventional additives (e.g., 1-50, often 10-20 or more % bwoc) are typically utilized to effect such changes.

Typical graphenes (referred to hereafter in this document as 'synthetic graphene (SG)') are produced from non-bioderived or non-renewable materials such as pyrolytic graphite. However, it has recently been discovered that graphene can also be made from green, renewable sources, such as, among many others, cassava root. As noted hereinabove, BRG of this disclosure comprises graphene produced (and/or derived) from any type of biomass, biomass waste, or other green, renewable, and sustainable feedstocks. BRG has been explored herein as a potential mechanical property modifier for oilwell cements and it has been unexpectedly discovered that BRG is more effective than the same amounts of synthetic graphene as a mechanical property modifier for cements. Without being limited by theory, it is postulated that the enhanced mechanical properties provided by the BRG relative to the SG in hardened cements of this disclosure may be due to higher availability of BRG dispersed in cement slurry mix water relative to synthetic graphene. It has surprisingly been discovered that BRG consistently outperforms synthetic graphene at set cement property enhancement at higher concentrations (e.g., greater than about 0.2% graphene bwoc. Without being limited by theory, it is believed that this unexpected increase is due to reduced BRG nanosheets remaining fully dispersed at concentrations above about 0.20 weight percent. Due to the highly hydrophobic nature thereof, SG tends to flocculate in aqueous mixtures at these concentrations. The flocculation of SG may lead to inhomogeneous dispersion of such SG nanosheets in the set cement, and consequently reduced set cement property enhancement relative to set cements of this disclosure comprising BRG.

Via this disclosure, BRG can be utilized to provide a hardened cement (also referred to as a "set" cement) having enhanced mechanical properties relative to hardened cement produced from a cement slurry comprising synthetic graphene (SG) or other non-BRG in place of at least a portion of the BRG. In embodiments described herein, amounts of graphene comprising, consisting of, or consisting essentially of BRG, e.g., pre-dispersed in a mix water, greater than about 0.2% bwoc, can be utilized to produce the cement slurry, which can subsequently be positioned in a workspace and allowed to harden in the workspace (e.g., wellbore) to provide the set cement of this disclosure having the enhanced mechanical properties. For brevity, reference to "enhanced mechanical properties" refers to enhanced mechanical properties relative to the same set cement produced from a cement slurry comprising a reduced amount of BRG and a same total amount of graphene (e.g., absent any BRG or comprising a reduced amount of BRG, while comprising a same overall amount of graphene), for example comprising SG in place of some or all of the BRG. As detailed further hereinbelow, the enhanced mechanical properties can include an increased compressive strength (CS), an increased Young's modulus, increased Poisson's ratio (PR), a reduced ratio of the YM to the CS (referred to as the YM/CS ratio), or a combination thereof. The CS can be the CS as measured via ASTM C39/C39M, the YM can be the YM as measured via ASTM C469/C469M. The PR can be measured via ASTM C469/C469M. The ASTM measurements can be at surface conditions.

The system and method of this disclosure provide for the use of BRG for enhancing one or more properties of a set cement produced by hardening a cement slurry comprising the BRG. Since graphene is highly temperature resistant, it can be utilized, in embodiments as described herein, for cementing at the high temperatures encountered in oilwell cementing operations. Utilizing graphene comprising BRG, as described herein, can provide mechanical property enhancement of the resulting cements, due to the mechanical property enhancement provided by the BRG.

Figure 2:
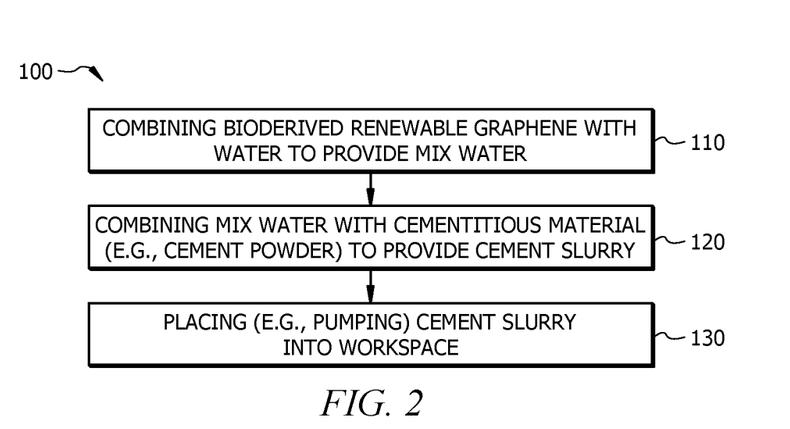
FIG. 2 is a schematic flow diagram of a method, according to embodiments of this disclosure.
Figure 3:
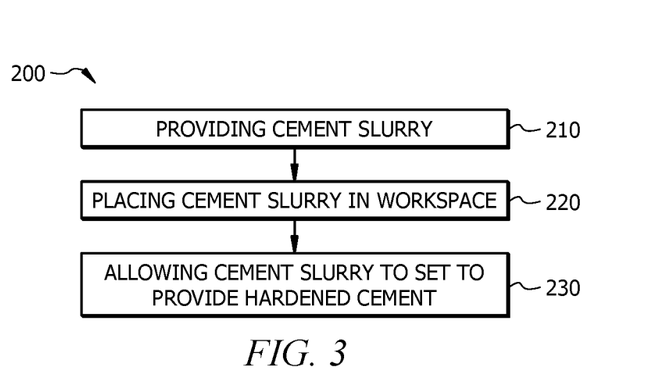
FIG. 3 is a schematic flow diagram of a method, according to embodiments of this disclosure.

As noted above, herein disclosed are cement slurries and methods of making and using same that provide for set cements having enhanced mechanical properties relative to set cements produced from cement slurries comprising SG in place of some portion (e.g., 10%-100%) of the BRG. The cement slurry of this disclosure, and methods of making and using same, will now be described with reference to FIG. 1, which is a schematic of a cement slurry 50 (also referred to herein as a "cement composition" 50), according to embodiments of this disclosure; FIG. 2, which is a schematic flow diagram of a method 100 of making such a cement slurry 50, according to embodiments of this disclosure; and FIG. 3, which is a schematic flow diagram of a method 200 of using the cement slurry 50, according to embodiments of this disclosure. Reference to "cement slurry" can indicate an unset cement slurry that has not yet hardened to a hardened or "set" cement, such as a recently mixed cement slurry. A set or hardened cement is obtained via allowing a cement slurry 50 to set for a time sufficient such that the cement slurry changes from a fluid to a solid state, as defined by the set cement reaching 50 psi compressive strength.

Figure 1:
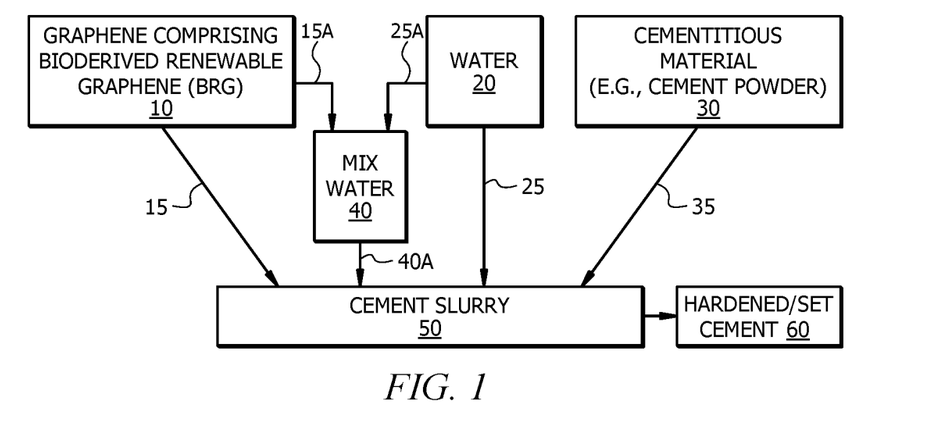
FIG. 1 is a schematic of a cement slurry, according to embodiments of this disclosure.

With reference to FIG. 1, a cement slurry 50 of this disclosure comprises graphene comprising, consisting essentially of, or consisting of BRG 10 (for brevity, referred to herein as graphene 10 comprising BRG or simply graphene 10), water 20 (also referred to herein as "aqueous base fluid" 20), and a cementitious material 30 (e.g., a cement powder, also referred to herein simply as a "cement"). The cement slurry 50 sets to provide a hardened or set cement 60 having enhanced mechanical properties relative to a set cement produced from an otherwise same cement slurry comprising SG (e.g., a non-BRG graphene) in place of at least a portion of the BRG.

The graphene 10 comprises bioderived renewable graphene (BRG). The cement slurry 50 can comprise from about 0.2 to about 20, from about 0.2 to about 15, from about 0.5 to about 5, or greater than or equal to about 0.2, 0.3, 0.4, 0.5, 1, 2, 3, 4, 5, 6, 7, 8, 9, 10, 11, 12, 13, 14, or 15, and/or and less than or equal to about 20, 19, 18, 17, 16, 15, 14, 13, 12, 11, 10, 9, 8, 7, 6, 5, 4, 3, 2, 1, 0.5, 0.4, 0.3, or 0.25 percent graphene (e.g., BRG) by weight of cement 20 (% graphene bwoc). The graphene 10 comprising BRG can comprise 10, 20, 30, 40, 50, 60, 70, 80, 90, or 100 wt % BRG, with any remainder of the graphene 10 being non-BRG graphene. In embodiments, the graphene 10 can consist or consist essentially of BRG (e.g., graphene 10 can consist essentially of or consist of BRG). For example, in embodiments, the cement slurry 50 can comprise from about 0.2 to about 20, from about 0.2 to about 15, from about 0.5 to about 5, or greater than or equal to about 0.2, 0.3, 0.4, 0.5, 1, 2, 3, 4, 5, 6, 7, 8, 9, 10, 11, 12, 13, 14, or 15, and/or and less than or equal to about 20, 19, 18, 17, 16, 15, 14, 13, 12, 11, 10, 9, 8, 7, 6, 5, 4, 3, 2, 1, 0.5, 0.4, 0.3, or 0.25 percent BRG by weight of cement 20 (% graphene bwoc).

As noted above, the graphene 10 comprises bioderived renewable graphene (BRG). In embodiments, the graphene 10 does not comprise or does not consist of any synthetic graphene. In embodiments, the graphene 10 consists essentially of or consists of BRG. The BRG comprises graphene 10 derived from a plant. In embodiments, the BRG comprises graphene 10 derived from a carbohydrate. For example, in embodiments, the carbohydrate comprises cassava (e.g., cassava root), corn (e.g., corn grain, corn flour), sugar cane (e.g., sucrose), sugar beets, wheat, yam, potatoes, and/or rice (e.g., rice grain), biomass waste (e.g., manure), crop waste, food processing waste, paper waste, agricultural waste, or a combination thereof. In embodiments, the graphene 10 comprises BRG derived from cassava, corn, and/or rice. The BRG can comprise graphene with a fused sheet-like morphology (e.g., graphene nanosheets, referred to herein as "nanosheets"). Sheet-like indicates stratified, deposited, or arranged in horizontal layers. For example, such BRG derived from cassava and comprising graphene nanosheets is described in U.S. Patent Publication No. 2021/0061661, U.S. Patent Publication No. 2021/0238040, and U.S. Patent Publication No. 2019/0144280, the disclosure of each of which is hereby incorporated herein in its entirety for purposes not contrary to this disclosure. In embodiments, the graphene 10 comprises, consists essentially of or consists of BRG such as described in the aforementioned patent applications and/or obtained from SurgePower Materials, Inc., New Braunfels, TX.

In embodiments, the BRG comprises a carbon nanosheet with distinct properties that can be produced from a renewable carbonaceous raw materials such as, without limitation, cassava root extract, corn flour, rice grain, wheat flour, yam root extract, potatoes root extract, sugar beet roots extract and sucrose (generally referred to herein as carbohydrates). The process for making carbon nanosheet from these carbohydrates can be as follows.

First, the aforementioned carbohydrate can be placed in a solvent, such as a solvent containing water or ethylene glycol or ethanol, to aid hydrolysis. This can be followed by gradual removing of glycosidic linkages in the carbohydrate via chemical and/or thermal activation. This pre-treatment step causes formation of intermediate fused carbon material, which contains limited amount of glycosidic bonds, hydroxyl and carbonyl groups Chemicals that can be effective include, without limitation, sodium hydroxide, hydrochloric acid, phosphoric acid, phosphorous acid, and nitric acid. In addition, catalyst such as yeast, aluminum-nickel alloy, cobalt, $B_2H_6$, zinc, and copper can be employed.

The mixture of carbonaceous material and chemical and/or catalyst can be exposed to approximately 45 to 1050° C., in air or inert atmosphere to aid formation of a fused carbon network with a sheet-like morphology, referred to herein as an intermediate carbon material.

Another step can include thermochemical activation of the intermediate carbon based material to initiate chemical bonding of carbon atoms to form a hexagonal planar network of mainly sp2 hybridization carbons. This occurs by at least switching oxygen atom and releasing hydroxyl portion of said intermediate carbon material to result in a short range or long range of aromatic ring structure or a mixture of both within the sheet that is retained and other groups or molecules are released. This step can be performed at temperature in the range of 500 to 1500° C., in an inert gas containing hydrogen gas, in embodiments, and can result in a network of high surface area and pore volume sp2 bonded carbon nanosheet.

The resulting carbon nanosheet powders can be washed with up to 10 volume percent hydrochloric acid (HCl) to remove any remaining precursors and catalyst in the final product, and can be followed by heat treatment at 700 to 1500° C., for example in inert atmosphere.

Alternatively or additionally, the step of treating the intermediate carbon product to form mainly sp2 hybridization carbons can be accomplished via chemical process. Such process can include, without limitation, treating the intermediate carbon product with a chemical, such as a chemical chosen from the group of hydrazine, $LiAlH_4$, $B_2H_6$, and/or $NaBH_4$; in embodiments, hydrazine, and in other embodiments $NaBH_4$.

As mentioned above, the process of producing carbon nanosheets can begin with a renewable carbonaceous raw material, such as cassava root extract, corn flour, rice grain, wheat flour, or sucrose. These renewable carbonaceous materials contain a high content of carbohydrates on a water free basis, typically more than 70% by weight. The renewable carbonaceous material can contain various percentages of glucose, and fructose bonded together by glycosidic linkages to form polymeric units such as amylase and amylopectin. Although the molecular formula for glucose and fructose are the same, thus ($C_6H_{23}O_6$), they have different molecular structures.

In order to obtain a carbon nanosheet, each carbohydrate unit can be pre-treated with a dehydration solution, for example containing at least 1% of acid or catalyst. The pretreatment can result in an intermediate carbon material with dark-grey color made up of fused sheet-like morphology.

The mechanism can unfold in two stages. First, the treatment of the carbohydrate via chemical and/or thermal activation can result in hydrolysis and removal of the glycosidic linkages in the polymeric carbohydrate unit to form individual glucose and fructose units. This can be followed by a second mechanism to remove water molecules from each of glucose or fructose units by a dehydration solution. The pretreatment can be accomplished by gradual heating of the carbohydrate and hydration solution, for example at 45 to 1050° C., preferably 80° C., e.g., for up to 36 hours or more. In the process, the carbon atoms can rearrange to form a ring with neighboring carbon atoms. The hydration solution can cause intercalation of the layers of carbon after ring formation, thus giving rise to a layered structure.

The intermediate carbon product can undergo a second treatment to exfoliate the intercalated carbon layers. Several thermal and/or chemical methods can be used to exfoliate the carbon sheet. Thermal methods include direct heating of the intermediate carbon material. Radiant heating in a resistive furnace, or on top of a hotplate, laser irradiation and microwave irradiation can be effective for exfoliating carbon nanosheet and removal of water molecules to form mainly sp2 bonded carbon nanosheets.

Thermal exfoliation via microwave heating can remove substantial amount of $H_2O$ molecules from the intermediate carbon materials, with a reduction in oxygen content from the intermediate carbon materials, for example from 39.5 to 14.6 weight percent.

Exfoliated carbon nanosheets can be washed (e.g., with a 10 volume percent HCl) to remove remaining hydration solution and/or catalyst compounds. Subsequently, the resulting product can be washed with de-ionized water one or several times, for example until the pH is about 7. The resulting material can be thermally treated at high temperature in inert atmosphere to remove any groups attached to the nanosheet and terminate the ends with hydrogen. The carbon nanosheets can have a sheet-like morphology, and carbon composition can be up to 90, 91, 92, 93, or 94 weight percent or more.

In an alternate method of producing BRG 10 comprising carbon nanosheets, the carbohydrate can be soaked in dehydration solution, as previously discussed. The mixture can be directly exposed to rapid and uniform high temperature heating immediately after thorough and uniform mixing. This can cause removal of glycosidic bonds and release of water molecules, thereby forcing the resulting intermediate carbon materials to exfoliate into carbon nanosheet. Specifically, heating can be accomplished by microwave irradiation and/or heating in an oven preheated, for example, to at least 500° C., to yield the carbon nanosheet.

In other embodiments, after thorough and uniform mixing of said carbohydrate and dehydration solution (e.g., containing excess deionized water), this mixture can be slowly heated to temperature below 100° C., and held there a time of, for example, less than 24 hours. The mixture can form a dark colored intermediate solution containing carbon. The dark intermediate solution can be coated on a substrate to form thin films. The resulting films can be exposed to high temperatures in inert atmosphere containing, for example, at least 2% by volume hydrogen gas. The films can be slowly heated, for example in the range of 700-1500° C., to form a thin layer of conducting carbon nanosheet on a substrate. The substrate can include, for example, copper foil, silicon wafer, glass slide or a quartz substrate.

In embodiments, a process for forming the nanosheets can comprise providing a renewable carbohydrate source to a reactor comprising a solvent to obtain a soaked or dissolved carbohydrate source; adding a dehydration solution and a catalyst to the reactor comprising the soaked or dissolved carbohydrate source to obtain a reaction mixture, e.g., where the dehydration solution has a hydrogen ions concentration of at least approximately 1%; charging said reactor with air or inert gas; heating the reaction mixture to remove glycosidic linkages and water molecules from the carbohydrate, thereby producing an intermediate mixture with sheet-like morphology; and further heating the intermediate mixture in inert gas to form the carbon nanosheet material. The carbon nanosheet material can be in the form of a powder. The carbohydrate source can comprise yam root extract, potato root extract, cassava root extract, cassava root flour, tapioca flour, dried cassava root pulp, dried and fried cassava root flakes, sugarcane extract, sugar beet root extract, sucrose, rice grain, corn, or wheat grain.

In embodiments, the solvent can be chosen from distilled water, deionized water, ethanol, and ethylene glycol. In embodiments, the dehydration solution can be chosen from sodium hydroxide, hydrochloric acid, phosphoric acid, phosphorous acid, and nitric acid. In embodiments, the process further comprises removing the dehydration solution by washing and diluting with excess distilled or deionized water prior to further heating of the intermediate mixture.

The catalyst can be chosen from platinum, palladium, $LiAlH_4$, nickel, yeast, aluminum-nickel alloy, cobalt, $B_2H_6$, zinc, $NaBH_4$, copper, or combinations thereof. The process can further include removing the catalyst by washing, filtering, magnetic separation, sonication, sieving, and/or centrifugation prior to further heating of the intermediate mixture.

The heating of the reaction mixture can be carried out in air or inert gas, for example at approximately 45 to 1050° C. The process can further include, prior to further heating the intermediate mixture, drying the intermediate mixture to produce an intermediate mixture in form of a powder; wherein the intermediate mixture in form of powder is heated in the inert gas, for example at approximately 500 to 1500° C., to produce the carbon nanosheet material. The inert gas can comprise, for example, argon, helium, or nitrogen, and can optionally further comprise a partial pressure of hydrogen gas. The intermediate mixture can be heated to a temperature of approximately 45 to 1050° C.

The carbon nanosheet material can have a specific surface area of at least 2000, 2100, 2200, 2300, 2400, or 2496 $m^2/g$ and/or a pore volume of at least 3.0, 3.1, 3.2, 3.3, 3.4, 3.5, or 3.6 cc/g. The carbon nanosheet material can have a pore volume of up to 3.0, 4.0, or 5.0 cc/g.

Cementitious material 30 (also referred to herein simply as "cement" 30) can comprise a cement powder, such as, without limitation, a Portland cement. A variety of cementitious materials 30 can be used in the cement slurry 50, including cementitious materials comprised of calcium, aluminum, silicon, oxygen, and/or sulfur which set and harden by reaction with water. Suitable hydraulic or pozzolanic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. In embodiments, cementitious material 30 comprises a Type I, IA, II, IIA, III, IIIA, IV, V, VI, or VII Portland cement, or a combination or subtype thereof, such as, for example, a Type IL (e.g., limestone) cement powder, as defined in the ASTM standard (e.g., ASTM C150). In embodiments, cementitious material 30 comprises a non-API cement. In embodiments, cementitious material 30 comprises an API cement, such as, for example, an API Portland cement from Class A, B, C, D, E, F, G, H, K, and/or L, such as from one of more of Classes A, C, H, and G.

In embodiments, cement 50 can comprise a construction grade cementitious material 30. According to this disclosure, a construction grade cement is a non-API cement, such as a cementitious material 30 comprising greater than about 1% by weight of tricalcium aluminate, C3A. In embodiments, the cementitious material 30 has an aluminate content (e.g., C3A) in a range of from about 1 to about 30, from about 3 to about 20, from about 5 to about 15, or greater than or equal to about 1, 3, or 5 percent aluminate by mass of cementitious material 30.

The cement slurry 50 of this disclosure can contain one or more additives. In embodiments, the additives comprise one or more selected from resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, cement kiln dust, gas migration control additives, formation conditioning agents, or combinations thereof.

Water 20 can comprise an aqueous base fluid. An aqueous base fluid 20 can be present in the cement slurry 50 in an amount sufficient to make a slurry which is pumpable for introduction to a desired location in a workspace, for example, down hole, in embodiments. In embodiments, the aqueous base fluid or water 30 comprises fresh water; brackish water; saltwater; or a combination thereof. The water 20 can be fresh water, brackish water, saltwater, or any combination thereof. In embodiments, the water 20 can be present in the cement slurry 50 in an amount of from about 20% to about 80% by weight of cement ("bwoc"), from about 28% to about 60% bwoc, or from about 36% to about 66% bwoc.

In embodiments, the cement slurry 50 can have a slurry density which is pumpable for introduction down hole. In embodiments, the density of the cement slurry 50 is from about 7 pounds per gallon (ppg) to about 20 ppg, from about 10 ppg to about 18 ppg, or from about 13 ppg to about 17 ppg.

A yield point of the cement slurry 50 as measured according to API 10B-2 (e.g., after two hours of quiescent aging at room temperature and pressure) can be reduced by at least 10, 20, 30, 40, or 50% relative to a same cement slurry absent the graphene 10. An apparent viscosity at 100 RPM (AVIS100) of the cement slurry 50 as measured, for example, according to API 10B-2 (e.g., after two hours of quiescent aging at room temperature and pressure) can be reduced by at least 10, 20, 30, 40, or 50% relative to the same cement slurry absent the graphene 10. A thixotropic rate of the cement slurry 50, measured as the ten minute yield point (e.g., measured according to API 10B-2) divided by ten can be less than a thixotropic rate of a same cement slurry absent the graphene 10. In embodiments, the thixotropic rate of the cement slurry 50 can be reduced by at least 5, 10, 15, or 20% relative to the thixotropic rate of the same cement slurry absent the graphene 10.

Also provided herein is a method of making a cement slurry 50. The method will now be described with reference to FIG. 2, which is schematic flow diagram of a method 100, according to embodiments of this disclosure. Method 100 of making the cement slurry 50 comprises, combining the graphene 10 comprising BRG and cementitious material 30 with water 20 to provide the cement slurry 50. In embodiments, as depicted at 110, graphene 10 comprising BRG is combined with water 20 to provide a mix water 40, and, at 120, the mix water 40 is combined with the cementitious material (e.g., cement powder) 30 to provide the cement slurry 50. Alternatively or additionally, graphene 10 comprising BRG can be otherwise incorporated into cement slurry 50. For example, in embodiments, graphene 10 comprising BRG can be dry blended into cement slurry 50. As depicted in FIG. 2, method 100 can further include, at 130, placing (e.g., pumping) the cement slurry 50 into a workspace.

As depicted in FIG. 1, line 15, 25, and 35 can be utilized to combine graphene 10 comprising BRG, water 20, and cementitious material 30, respectively. Alternatively or additionally, lines 15A and 25A can be utilized to combine graphene 10 comprising BRG with water 20 to provide mix water 40, and lines 40A and 35 can be utilized to combine the mix water 40 and cementitious material 30 to provide the cement slurry 50. The order of combination of the graphene 10 comprising BRG, water 20, and cementitious material 30 can be adjusted, and remain within the scope of this disclosure.

As described hereinabove, the graphene 10 comprises bioderived renewable graphene (BRG), such as, without limitation, BRG comprising graphene derived from a plant, such as the cassava plant. The BRG can comprise graphene with a fused sheet-like morphology (e.g., graphene nanosheets), such as the graphene 10 comprising BRG described in U.S. Patent Publication No. 2021/0061661, U.S. Patent Publication No. 2021/0238040, and/or U.S. Patent Publication No. 2019/0144280, incorporated hereinabove by reference. Without being limited by theory, BRG can provide enhanced results relative to non-bioderived graphene (e.g., SG) due to characteristics of the BRG provided by the production thereof. For example, the BRG can have an increased dispersibility relative to non-bioderived graphene (e.g., SG). The BRG can provide more homogenous dispersions than 'synthetic' graphene which has the tendency to flocculate.

As discussed hereinabove, the cement slurry 50 can comprise from about 0.2 to about 20, from about 0.2 to about 15, from about 0.2 to about 5, from about 0.5 to about 5, or greater than or equal to about 0.2, 0.3, 0.4, 0.5, 1, 2, 3, 4, 5, 6, 7, 8, 9, 10, 11, 12, 13, 14, 15, 16, 17, 18, 19, or 20 and less than or equal to about 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, 0.3, or 0.25 percent graphene 10 comprising BRG (e.g., graphene consisting of BRG) by weight of cementitious material 30 (% BRG bwoc).

As noted above, the cementitious material 30 can comprise a Portland cement, such as, for example, a Type I, IA, II, IIA, III, IIIA, IV, V, VI, or VII Portland cement, a subtype thereof, or a combination thereof. In embodiments, the cementitious material 30 comprises a construction grade (e.g., non-API) cement, as described hereinabove. The construction grade cement can be a cement comprising greater than about 1 weight percent (wt %) calcium aluminate (C3A).

Also disclosed herein is a method of using the cement slurry 50 of this disclosure, for example, to provide a set cement 60 (FIG. 1) having enhanced mechanical properties relative to a same cement absent the BRG (e.g., comprising SG in place of at least a portion or all of the BRG). Such a method will now be described with reference to FIG. 3, which is a schematic flow diagram of a method 200, according to embodiments of this disclosure. Method 200 comprises: providing a cement slurry 50 of this disclosure at 210, placing the cement slurry 50 in a workspace at 220, and allowing the cement slurry 50 to set to provide a hardened cement 60 (also referred to herein as a "set" cement) at 230. The cement slurry can be a cement slurry 50 as described hereinabove with reference to FIG. 1 and/or made as described hereinabove with reference to FIG. 2, wherein the cement slurry 50 comprises graphene 10 comprising, consisting essentially of, or consisting of BRG, a cementitious material (e.g., cement powder) 30, and water 20.

The workspace can comprise an oilwell workspace, such as, for example and without limitation, a subterranean workspace, such as a wellbore. In embodiments, the workspace comprises a non-oilwell workspace, such as, for example and without limitation, a construction site, roadway repair, tunnel/mining, bridges, etc.

As detailed hereinabove, the graphene 10 comprising BRG can comprise graphene 10 derived from a plant, such as, without limitation, the cassava plant. The BRG can comprise graphene nanosheets, in embodiments.

As noted hereinabove, the cement slurry 50 can comprise from about 0.2 to about 20, from about 0.2 to about 15, from about 0.2 to about 5, from about 0.5 to about 5, or greater than or equal to about 0.2, 0.3, 0.4, 0.5, 1, 2, 3, 4, 5, 6, 7, 8, 9, 10, 11, 12, 13, 14, 15, 16, 17, 18, 19, or 20 and less than or equal to about 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, 0.3, or 0.25 percent graphene (e.g., BRG) by weight of cementitious material 30 (% BRG bwoc).

As noted above, in embodiments, the cementitious material 30 comprises a Portland cement, such as a Type I, IA, II, IIA, III, IIIA, IV, V, VI, or VII Portland cement, a subtype thereof, or a combination thereof. In embodiments, the cementitious material 30 comprises a construction grade (e.g., non-API) cement, wherein, as described hereinabove, a construction grade cement is a cement comprising greater than about 1 wt % calcium aluminate (C3A).

By way of non-limiting example, the exemplary cement slurries 50 disclosed herein may be employed in an oilwell workspace. For example, a cement slurry 50 can be deployed at the workspace via any methods known in the art and with the help of this disclosure. For example, cement slurry 50 can be introduced downhole via a cementing apparatus.

Figure 4:
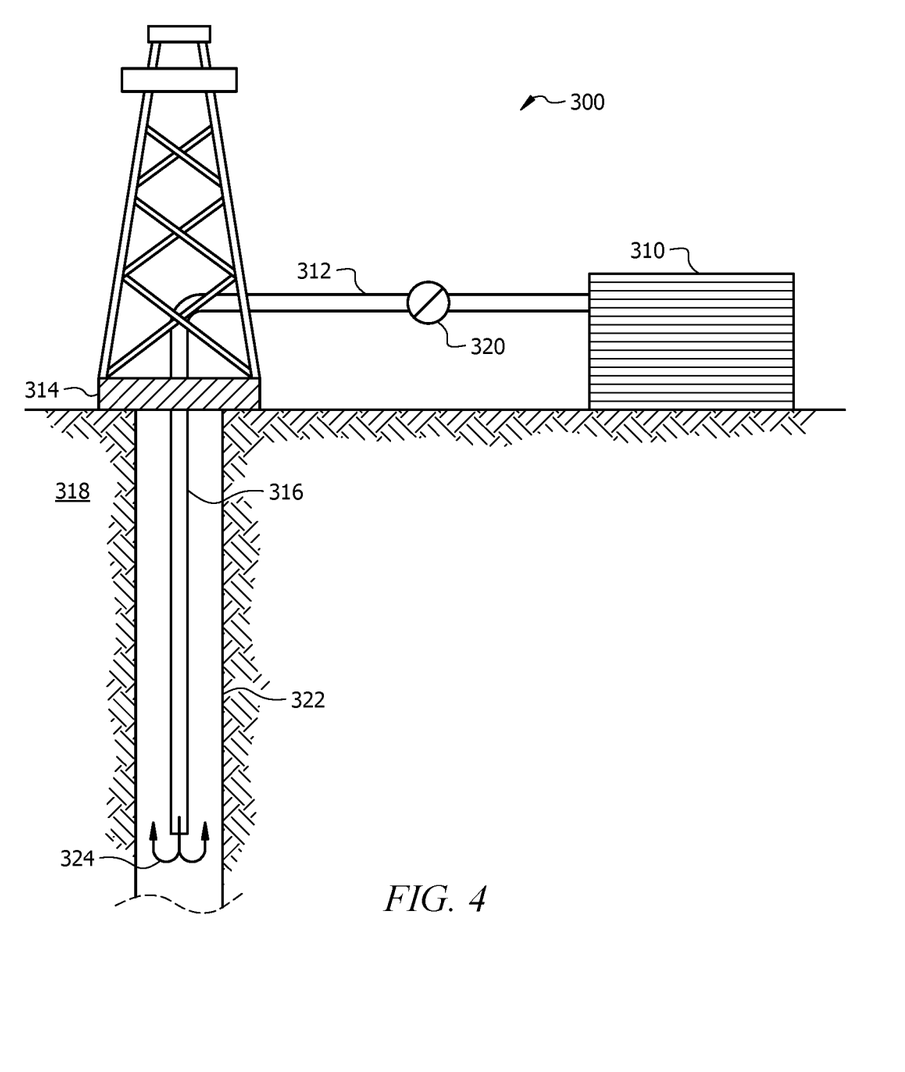
FIG. 4 is a schematic of a cementing workspace, according to embodiments of this disclosure.

FIG. 4 shows an illustrative schematic of cementing workspace or system 300 that can deliver cement slurry 50 of the present disclosure to a downhole location, according to one or more embodiments. It should be noted that while FIG. 4 generally depicts a land-based system, it is to be recognized that like systems may be operated in subsea locations as well. As depicted in FIG. 4, system 300 may include mixing tank 310, in which a cement slurry 50 of the present disclosure may be formulated. Again, in some embodiments, the mixing tank 310 may represent or otherwise be replaced with a transport vehicle or shipping container configured to deliver or otherwise convey the final cement slurry to the well site. The cement slurry 50 may be conveyed via line 312 to wellhead 314, where the cement slurry 50 enters tubular 316 (e.g., a casing, drill pipe, production tubing, coiled tubing, etc.), tubular 316 extending from wellhead 314 into wellbore 322 penetrating subterranean formation 318. Upon being ejected from tubular 316, the cement slurry 50 may subsequently return up the wellbore in the annulus between the tubular 316 and the wellbore 322 as indicated by flow lines 324. In other embodiments, the cement slurry 50 may be reverse pumped down through the annulus and up tubular 316 back to the surface, without departing from the scope of the disclosure. Pump 320 may be configured to raise the pressure of the cement slurry to a desired degree before its introduction into tubular 316 (or annulus). It is to be recognized that system 300 is merely exemplary in nature and various additional components may be present that have not necessarily been depicted in FIG. 4 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Moreover, reverse cementing, where the final cement slurry is directly placed in the annulus between the tubular 316 and the wellbore 322 may also be performed in accordance with the embodiments described herein, without departing from the present disclosure.

One skilled in the art, with the benefit of this disclosure, should recognize the changes to the system described in FIG. 4 to provide for other cementing operations squeeze operations, reverse cementing (where the cement is introduced into an annulus between a tubular and the wellbore and returns to the wellhead through the tubular), and the like.

It is also to be recognized that the disclosed cement slurries 50 may also directly or indirectly affect the various downhole equipment and tools that may come into contact with the final cement slurry during operation. Such equipment and tools may include, but are not limited. to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 4.

Upon setting, the hardened cement (60 in FIG. 1) produced by allowing the cement slurry 50 to set (e.g., for a setting time) can have a compressive strength, a tensile strength, a Young's modulus, a Poisson's ratio, or a combination thereof that is at least as high as a compressive strength (CS), a tensile strength, a Young's modulus (YM), a Poisson's ratio, or a combination thereof of a hardened cement 60 produced from a same cement slurry absent the BRG and/or comprising SG in place of all or a portion of the BRG. In embodiments, a ratio of the YM to the CS (i.e., the YM/CS ratio) of the hardened cement 60 is reduced relative to the YM/CS ratio of a hardened cement produced from a same cement slurry comprising a graphene other than BRG (e.g., SG) in place of at least a portion (e.g., in place of 10, 20, 30, 40, 50, 60, 70, 80, 90, or 100%) of the BRG. In embodiments, the hardened cement 60 has an increased resilience relative to the hardened cement produced from the same cement slurry comprising the graphene other than BRG (e.g., SG) in place of the at least the portion of the BRG. A reduction in YM/CS ratio indicates increased resilience of the set cement.

In embodiments, the hardened cement 60 has a CS that is at least 5, 10, 20, 30, 40, 45, or 50, % or more, or from about 5 to about 50, from about 10 to about 50, or from about 20 to about 50% greater than the CS of the hardened cement produced from the same cement slurry comprising the graphene other than BRG (e.g., SG) in place of at least a portion (e.g., in place of 10, 20, 30, 40, 50, 60, 70, 80, 90, or 100%) of the BRG, and a same overall amount (e.g., greater than 0.2, 0.3, 0.4, or 0.5 wt % graphene bwoc.

In embodiments, the hardened cement 60 has a YM that is at least 5, 10, 15, 20, 25, 30, 40, 45, or 50, % (or more), or from about 5 to about 50, from about 10 to about 40, or from about 20 to about 25% greater than the CS of the hardened cement produced from the same cement slurry comprising the graphene other than BRG (e.g., SG) in place of at least a portion (e.g., in place of 10, 20, 30, 40, 50, 60, 70, 80, 90, or 100%) of the BRG, and a same overall amount (e.g., greater than 0.2, 0.3, 0.4, or 0.5 wt % graphene bwoc.

In embodiments, the hardened cement 60 has a YM/CS ratio that is at least 1, 2, 3, 4, 5, 6, 7, 8, 9, 10, 11, 12, 13, 14, 15% (or more), or from about 1 to about 40, from about 5 to about 40, or from about 10 to about 15% less than the YM/CS ratio of the hardened cement produced from the same cement slurry comprising the graphene other than BRG (e.g., SG) in place of at least a portion (e.g., in place of 10, 20, 30, 40, 50, 60, 70, 80, 90, or 100%) of the BRG, and a same overall amount (e.g., greater than 0.2, 0.3, 0.4, or 0.5 wt % graphene bwoc).

In embodiments, a resilience of the hardened cement 60 (as indicated by a reduction in YM/CS ratio) is at least 10, 20, 30, 40, or 50% greater than the resilience of the hardened cement produced from the same cement slurry comprising the graphene other than BRG (e.g., SG) in place of at least a portion (e.g., in place of 10, 20, 30, 40, 50, 60, 70, 80, 90, or 100%) of the BRG, and a same overall amount (e.g., greater than 0.2, 0.3, 0.4, or 0.5 wt % graphene bwoc.

In embodiments, the graphene 10 comprising BRG can be utilized and/or serves as a suspension aid in a cement slurry 50 of this disclosure, for example, as described in U.S. patent application Ser. No. 17/892,775 (4727-37900), filed Aug. 22, 2022 and entitled, "Graphene Fluid Utilized to Suspend Particulates", the disclosure of which is hereby incorporated herein in its entirety for purposes not contrary to this disclosure; the graphene 10 comprising BRG can be utilized and/or serves as a cement retarder in a cement slurry 50 of this disclosure, for example, as described in U.S. patent application Ser. No. 17/892,781 (4727-38000), filed Aug. 22, 2022 and entitled, "Graphene as a Cement Retarder", the disclosure of which is hereby incorporated herein in its entirety for purposes not contrary to this disclosure; the graphene 10 comprising BRG can be utilized and/or serves to mitigate transient gels in a composition 50 of this disclosure, for example, as described in U.S. patent application Ser. No. 17/892,790 (4727-38100), filed Aug. 22, 2022 and entitled, "Mitigation of Transient Gels in Cements", the disclosure of which is hereby incorporated herein in its entirety for purposes not contrary to this disclosure; and/or the graphene 10 comprising BRG can be utilized and/or serves to enhance stability and density control in a cement slurry 50 of this disclosure, for example, as described in U.S. patent application Ser. No. 17/892,790 (4727-38200), filed Aug. 22, 2022 and entitled, "Use of Graphene To Enhance Stability and Density Control of Cement Slurries", the disclosure of which is hereby incorporated herein in its entirety for purposes not contrary to this disclosure.

As described herein, BRG can be utilized to produce hardened cements 60 having enhanced mechanical properties relative to hardened cements produced in the absence of or with reduced amounts of BRG.

Graphene (e.g., graphene nanoplatelets) can positively enhance the mechanical properties (e.g., CS, YM) of the hardened cement 60. Without being limited by theory, this may be due to the effect of the nanoplatelets on the microstructure of the cement during the hardening/curing process. However, typical graphene nanoplatelets are highly hydrophobic and do not readily disperse in aqueous fluids. Low dispersion levels can lead to reduced effectiveness as a mechanical property modifier, especially at higher graphene concentrations (e.g., greater than about 0.2% bwoc). The low dispersion is conventionally overcome by the addition of secondary additives, such as surfactants. It has been unexpectedly discovered that, at typical loadings of graphene, BRG enhances the mechanical properties of the hardened cement 60 as much as or more than SG. Furthermore, BRG unexpectedly improves the properties of the hardened cement 60 more than SG at relatively higher loadings (e.g., greater than about 0.2 wt %) without the need for any secondary dispersive additives (e.g., surfactants). Furthermore, unlike conventional additives, BRG can effectively simultaneously increase both the mechanical properties (e.g., CS and/or YM) and the resiliency (e.g., as demonstrated by YM/CS) of the hardened cement 60. Accordingly, the BRG can be utilized in place of such conventional additives, at lower loadings, for example, 0.2, 0.3, 0.4, 0.5, 0.6, 0.7, 0.8, 0.9, 1, 2, 3, 4, or 5% bwoc rather than the conventional 10-20% bwoc. The lower loading of the BRG relative to conventional additives can, in embodiments, provide for more efficient transport, storage, and/or operational footprint. In addition to reducing operational footprint (e.g., reduced storage space, logistics cost, etc.), the use of BRG as detailed herein can reduce a cost of goods sold (COGS), by reducing overall additive cost. For example, COGS savings of from about 5 to about 50% or more may be realized via the use of BRG in a cement slurry 50 as described herein.

Since graphene 10 comprising BRG is highly temperature resistant, it can be utilized, in embodiments as described herein, for cementing at the high temperatures encountered in oilwell cementing operations. Utilization of the graphene10 comprising BRG, as described herein, can provide mechanical property enhancement of the hardened cements 60 resulting from hardening of the cement slurries 50 of this disclosure, due to the mechanical property modification properties provided by the BRG. In embodiments, the set cement 60 has an increased resilience relative to a set cement produced from a same cement slurry 50 absent the BRG and/or comprising a reduced amount of the BRG.

Other advantages will be apparent to those of skill in the art and with the help of this disclosure.

EXAMPLE

The embodiments having been generally described, the following example is given as a particular example to demonstrate the practice and advantages of this disclosure. It is understood that the example is given by way of illustration and is not intended to limit the specification or the claims in any manner.

Table 1 below shows the formulations of the cement slurries used in this Example. Seven cement slurries were prepared. The Control contained no graphene. BRG1, BRG2, and BRG3 were cement slurries of this disclosure containing 0.2, 0.4, and 0.7 weight percent bioderived renewable graphene, respectively. SG1, SG2, and SG3 were comparative cement slurries containing 0.2, 0.4, and 0.7 weight % synthetic graphene, respectively.

The cement slurries were mixed and blended following API procedures (API RP 10B-2) and poured into 1×3 inch brass molds. The molds were placed in water baths and cured at 180° F. for 48 hours. After initial curing, the set cement samples were removed from the brass molds and placed in 2-cube autoclaves which were filled with water. The cement samples were then cured in the autoclave at 180° F. and 3000 psi for seven days. After autoclave curing, the hardened cement samples were collected and submitted for mechanical property testing and the results were tabulated (Table 1). All mechanical property measurements were performed on three separate samples and the data in Table 1 is the average for each property. YM was determined according to ASTM C469/C469M, and CS was determined according to ASTM C39/C39M.

TABLE 1

Data from The Example

| Slurry # | Graphene (wt. %) | Water (wt. %) | Cement (wt. %) | Suspending Aid (wt. %) | Measured Density (ppg) | Compressive Strength (psi) | Young's Modulus (Mpsi) | YM/CS |
|---|---|---|---|---|---|---|---|---|
| Control | 0 | 31.7 | 68.20 | 0.1 | 15.8 | 3437 | 1.35 | 367 |
| BRG1 | 0.2 | 31.7 | 68.07 | 0.03 | 15.8 | 3780 | 1.42 | 352 |
| BRG2 | 0.4 | 31.6 | 67.97 | 0.03 | 15.8 | 4294 | 1.58 | 334 |
| BRG3 | 0.7 | 31.5 | 67.77 | 0.03 | 15.8 | 4134 | 1.39 | 320 |
| SG1 | 0.2 | 31.7 | 68.07 | 0.03 | 15.8 | 3842 | 1.40 | 367 |
| SG2 | 0.4 | 31.6 | 67.97 | 0.03 | 15.8 | 4170 | 1.54 | 347 |
| SG3 | 0.7 | 31.5 | 67.77 | 0.03 | 15.8 | 3128 | 1.18 | 364 |

Figure 5:
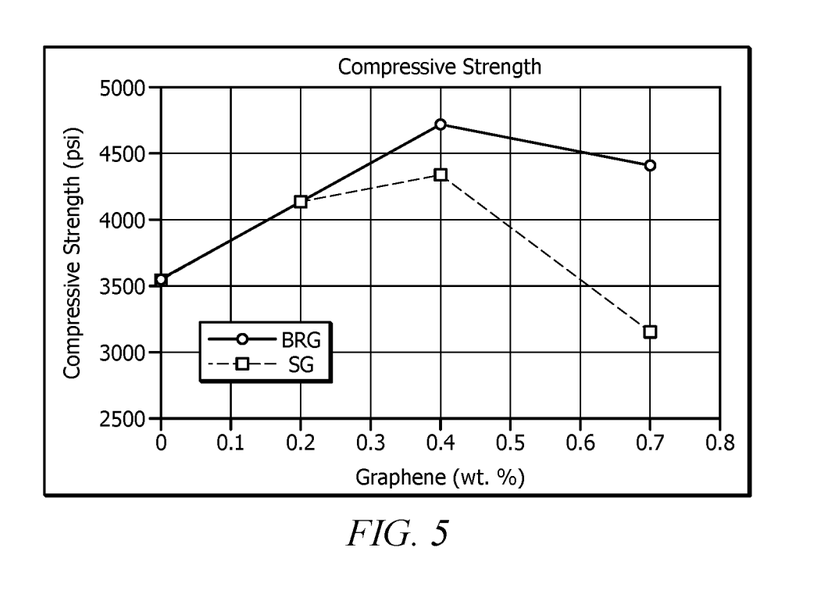
FIG. 5 is a plot of compressive strength (CS; psi) of set cement as a function of the amount of graphene (% BRG by weight of cement (bwoc)) in the cement slurries of the Example.

The compressive strength data from Table 1 is depicted in FIG. 5, which is a plot of the compressive strength (CS; in psi) of the set cement 60 as a function of the amount of graphene (% graphene by weight of cement (bwoc)) in the cement slurry 50. As seen in Table 1 and FIG. 5, at lower concentrations of graphene (e.g., at about 0.20 wt. % graphene bwoc and less) both forms of graphene, SG and BRG, similarly enhance the compressive strength of the hardened cement 60. However, at higher concentrations (e.g., greater than about 0.20 wt. % graphene bwoc), the BRG continues to increase the compressive strength while the SG seems to plateau and then drop. At the highest concentrations of BRG, the CS of the BRG also decreases slightly, but the decrease is dampened in the case of the BRG.

Figure 6:
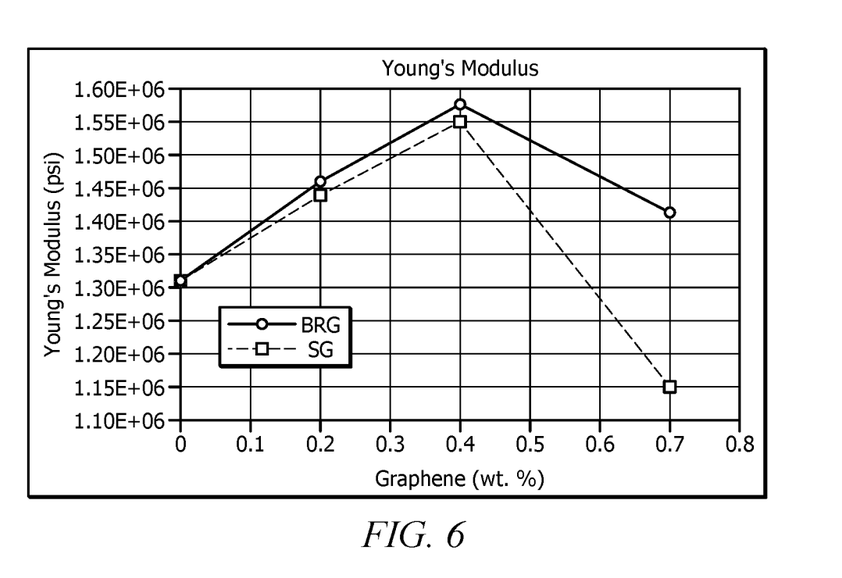
FIG. 6 is a plot of Young's modulus (YM; psi) of set cement as a function of the amount of graphene (% BRG bwoc) in the cement slurries of the Example.

The Young's Modulus (YM) data collected from the cements of this Example, with various graphene types and loadings is plotted in FIG. 6, which is a plot of Young's modulus (YM; in psi) of the set cement 60 as a function of the amount of graphene (% graphene bwoc) in the cement slurry 50. For all data points, the hardened cements 60 comprising the BRG graphene 10 shows an increase (although slight) in YM as compared to the hardened cement 60 comprising the synthetic graphene (SG). Similar to compressive strength, at about 0.40 wt. % graphene loading, the YM of the cements with SG decrease precipitously, while those with BRG as graphene 10 decrease to a lesser degree.

Figure 7:
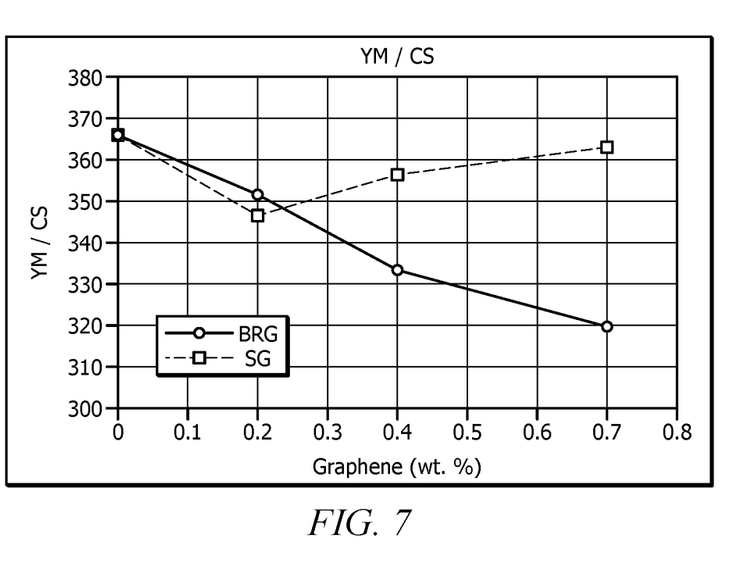
FIG. 7 is a plot of the ratio of YM/CS of set cement as a function of the amount of graphene (% BRG bwoc) in the cement slurries of the Example.

Although an increase in YM is not generally desired with hardened cement 60, the relative increase in compressive strength must also be considered to get a better understanding of the overall changes in mechanical properties. The values of the Young's Modulus from Table 1 are divided by Compressive Strength of Table 1 for each sample. FIG. 7 is a plot of this ratio of YM/CS of set cement 60 as a function of the amount of graphene (% bwoc) in the cement slurry, for the data of the Example. The YM/CS ratio provides a good indication of overall changes in mechanical properties, with lower values of the YM/CS ratio representing more resilient hardened cements 60, e.g., lower YM and higher CS.

The data in this Example indicate that at graphene loadings above about 0.20 wt. % bwoc, BRG enhances cement mechanical properties more effectively than SG. At higher loadings the BRG provides a hardened cement 60 for which the YM/CS ratio trends downward towards more resilient hardened cement 60, while the hardened cement formed with the SG shows an initial decrease in the YM/CS ratio and then trends back towards mechanical properties similar to the control comprising no graphene.

ADDITIONAL DISCLOSURE

The following are non-limiting, specific embodiments in accordance with the present disclosure:

In a first embodiment, a method comprises: providing a cement slurry comprising: graphene; a cement; and water, wherein the graphene comprises bioderived renewable graphene (BRG), and wherein the cement slurry comprises from about 0.2 to about 20 percent graphene by weight of cement (% graphene bwoc); placing the cement slurry in a workspace; and allowing the cement slurry to set to provide a hardened cement, wherein a compressive strength (CS), a Young's modulus (YM), and/or a reduction in a ration of YM/CS of the hardened cement is greater than the CS, YM, or the reduction in the YM/CS ratio of a same cement absent the BRG (or comprising a reduced amount of the BRG) and comprising synthetic graphene (in place of at least a portion or all of the BRG).

A second embodiment can include the method of the first embodiment, wherein the workspace comprise a wellbore penetrating a subterranean formation.

A third embodiment can include the method of the second embodiment, wherein the workspace comprises an annulus between a tubular and a wall of the wellbore.

A fourth embodiment can include the method of the second or third embodiment, wherein the cement slurry comprises from about 0.2 to about 20% BRG bwoc.

A fifth embodiment can include the method of any one of the second to fourth embodiments, wherein the BRG comprises graphene derived from a plant.

A sixth embodiment can include the method of any one of the second to fifth embodiments, wherein the BRG comprises graphene with a fused sheet-like morphology.

A seventh embodiment can include the method of any one of the first to sixth embodiments, wherein the cement comprises a cement selected from the group consisting of Type I, IA, II, IIA, III, IIIA, IV, V, VI, VII Portland cements, and combinations thereof.

An eighth embodiment can include the method of any one of the first to seventh embodiments, wherein the cement comprises a construction grade cement, wherein a construction grade cement is a cement comprising greater than about 1 weight percent (wt %) calcium aluminate (C3A).

A ninth embodiment can include the method of any one of the first to eighth embodiments, wherein the Young's modulus of the hardened cement is greater than the Young's modulus of the same cement absent the BRG and comprising synthetic graphene.

A tenth embodiment can include the method of the ninth embodiment, wherein the hardened cement has increased resiliency relative to the same cement, wherein the resiliency is determined as the reduction in the ratio of the Young's modulus to the compressive strength.

An eleventh embodiment can include the method of the tenth embodiment, wherein the ratio of the Young's modulus to the compressive strength of the hardened cement is reduced by at least 10, 20, 30, 40, or 50% relative to the ratio of the Young's modulus to the compressive strength of the same cement.

A twelfth embodiment can include the method of any one of the first to twelfth embodiments further comprising forming the BRG by: providing a renewable carbohydrate source to a reactor comprising a solvent to obtain a soaked or dissolved carbohydrate source; adding a dehydration solution and a catalyst to the reactor comprising the soaked or dissolved carbohydrate source to obtain a reaction mixture, where the dehydration solution has a hydrogen ions concentration of at least approximately 1%; charging said reactor with air or inert gas; heating the reaction mixture to remove glycosidic linkages and water molecules from the carbohydrate thereby producing an intermediate mixture with sheet-like morphology; and further heating the intermediate mixture in inert gas to form a carbon nanosheet material comprising BRG.

A thirteenth embodiment can include the method of the twelfth embodiment, wherein said carbohydrate source comprises yam root extract, potatoes root extract, cassava root extract, cassava root flour, tapioca flour, dried cassava root pulp, dried and fried cassava root flakes, sugarcane extract, sugar beet root extract, sucrose, rice grain, corn, wheat grain, or a combination thereof.

A fourteenth embodiment can include the method of the twelfth or thirteenth embodiment, wherein the solvent is chosen from the group consisting of distilled water, deionized water, ethanol, ethylene glycol, or a combination thereof.

A fifteenth embodiment can include the method of any one of the twelfth to fourteenth embodiments, wherein the dehydration solution is chosen from the group consisting of sodium hydroxide, hydrochloric acid, phosphoric acid, phosphorous acid, nitric acid, or a combination thereof.

A sixteenth embodiment can include the method of any one of the twelfth to fifteenth embodiments further comprising removing the dehydration solution by washing and diluting with excess distilled or deionized water prior to further heating of the intermediate mixture.

A seventeenth embodiment can include the method of any one of the twelfth to sixteenth embodiments, wherein the catalyst is chosen from the group consisting of platinum, palladium, $LiAlH_4$, nickel, yeast, aluminum-nickel alloy, cobalt, $B_2H_6$, zinc, $NaBH_4$, copper, or combinations thereof.

An eighteenth embodiment can include the method of any one of the twelfth to seventeenth embodiments further comprising removing said catalyst by washing, filtering, magnetic separation, sonication, sieving, centrifugation, or a combination thereof prior to further heating of the intermediate mixture.

A nineteenth embodiment can include the method of any one of the twelfth to eighteenth embodiments, wherein the heating of the reaction mixture is carried out in air or inert gas at approximately 45 to 1050° C.

A twentieth embodiment can include the method of any one of the twelfth to nineteenth embodiments further comprising, prior to further heating the intermediate mixture, drying the intermediate mixture to produce an intermediate mixture in form of a powder; wherein the intermediate mixture in form of powder is heated in the inert gas at approximately 500 to 1500° C. to produce the carbon nanosheet material.

A twenty first embodiment can include the method of any one of the twelfth to twentieth embodiments, wherein said inert gas comprises argon, helium, or nitrogen, and optionally further comprises a partial pressure of hydrogen gas.

A twenty second embodiment can include the method of any one of the twelfth to twenty first embodiments, wherein the intermediate mixture is heated to a temperature of approximately 45 to 1050° C.

In a twenty third embodiment, a hardened cement produced by allowing a cement slurry to set, wherein the cement slurry comprises: graphene; a cement; and water, wherein the graphene comprises bioderived renewable graphene (BRG), and wherein the cement slurry comprises from about 0.2 to about 20 percent graphene by weight of cement (% graphene bwoc), wherein a resiliency of the hardened cement is increased relative to the resiliency of a hardened cement produced from a same cement slurry absent the BRG (or comprising a reduced amount of the BRG) and comprising synthetic graphene (in place of all or a portion of the BRG), wherein the increased resiliency is determined as a reduction in the ratio of the Young's modulus to the compressive strength.

A twenty fourth embodiment can include the hardened cement of the twenty third embodiment, wherein the hardened cement has an increased Young's modulus, an increased compressive strength, or both an increased Young's modulus and an increased compressive strength relative to the same cement.

A twenty fifth embodiment can include the hardened cement of the twenty fourth embodiment, wherein the ratio of the Young's modulus to the compressive strength of the hardened cement is reduced by at least 10, 20, 30, 40, or 50% relative to the ratio of the Young's modulus to the compressive strength of the same cement.

In a twenty sixth embodiment, a subterranean structure comprises: a tubular disposed in a wellbore and a hardened cement disposed in an annulus between a wall of the wellbore and the tubular, wherein the hardened cement is bonded to the tubular and the wall of the wellbore to seal a portion of the annulus from fluid flow; wherein the hardened cement is a product of the setting of a cement slurry comprising: graphene; a cement; and water, wherein the graphene comprises bioderived renewable graphene (BRG), and wherein the cement slurry comprises from about 0.2 to about 20 percent graphene by weight of cement (% graphene bwoc), wherein a Young's modulus (YM), a compressive strength (CS), and/or a reduction in a ratio of YM/CS of the hardened cement is greater than the YM, CS, or the reduction in the YM/CS ratio of a hardened cement produced from a same cement slurry comprising a same amount of graphene, but wherein the graphene of the same cement slurry comprises a reduced amount (or none) of the BRG.

A twenty seventh embodiment can include the subterranean structure of the twenty sixth embodiment, wherein the CS of the hardened cement is greater than the compressive strength of the hardened cement produced from the same cement slurry.

A twenty eighth embodiment can include the subterranean structure of the twenty sixth or the twenty seventh embodiment, wherein the cement slurry comprises from about 0.2 to about 20% BRG bwoc.

A twenty ninth embodiment can include the subterranean structure of any one of the twenty sixth to twenty eighth embodiments, wherein the BRG comprises graphene derived from a plant.

A thirtieth embodiment can include the subterranean structure of any one of the twenty sixth to twenty ninth embodiments, wherein the BRG comprises graphene with a fused sheet-like morphology.

A thirty first embodiment can include the subterranean structure of any one of the twenty sixth to thirtieth embodiments, wherein the cement comprises a cement selected from the group consisting of Type I, IA, II, IIA, III, IIIA, IV, V, VI, VII Portland cements, and combinations thereof.

A thirty second embodiment can include the subterranean structure of any one of the twenty sixth to twenty first embodiments, wherein the cement comprises a construction grade cement, wherein a construction grade cement is a cement comprising greater than about 1 weight percent (wt %) calcium aluminate (C3A).

In a thirty third embodiment, a method comprises: providing a cement slurry comprising: graphene; a cement; and water, wherein the graphene comprises bioderived renewable graphene (BRG), and wherein the cement slurry comprises from about 0.2 to about 20 percent graphene by weight of cement (% graphene bwoc); placing the cement slurry in a workspace; and allowing the cement slurry to set to provide a hardened cement.

A thirty fourth embodiment can include the method of the thirty third embodiment, wherein a mechanical property of the hardened cement is greater than the mechanical property of a same cement absent the BRG and comprising synthetic graphene.

A thirty fifth embodiment can include the method of the thirty third or thirty fourth embodiment, wherein the mechanical property is selected from a compressive strength, a Young's modulus, or a combination thereof.

A thirty sixth embodiment can include the method of any one of the thirty third to thirty fifth embodiments, wherein the hardened cement has increased resiliency relative to the same cement, wherein the resiliency is determined as a reduction in a ratio of the Young's modulus to the compressive strength.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc.

should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
   providing a cement slurry comprising: graphene; a cement; and water, wherein the graphene comprises bioderived renewable graphene (BRG), wherein the BRG comprises nanosheets, wherein the nanosheets have a surface area of from 2000 to 5000 m²/g, a pore volume of from 3 to 5 cc/g, or a combination thereof, and wherein the cement slurry comprises from 0.2 to 20 percent of the graphene by weight of cement (% graphene bwoc);
   placing the cement slurry in a workspace, wherein the workspace comprises a wellbore penetrating a subterranean formation; and
   allowing the cement slurry to set to provide a hardened cement,
   wherein one or more of a compressive strength (CS), a Young's modulus (YM), or a reduction in a ratio of YM/CS of the hardened cement is greater than a CS, YM, or reduction in ratio of YM/CS, respectively, of an otherwise same hardened cement produced from an otherwise same cement slurry comprising synthetic graphene in place of the BRG.

2. The method of claim 1, wherein the workspace comprises an annulus between a tubular and a wall of the wellbore.

3. The method of claim 1, wherein the graphene consists of the BRG.

4. The method of claim 1, wherein the BRG comprises graphene derived from a plant.

5. The method of claim 1, wherein the BRG comprises graphene with a fused sheet-like morphology.

6. The method of claim 1, wherein the cement comprises a cement selected from the group consisting of Type I, IA, II, IIA, III, IIIA, IV, V, VI, VII Portland cements, and combinations thereof.

7. The method of claim 1, wherein the cement comprises a construction grade cement, wherein the construction grade cement comprises greater than 1 weight percent (wt %) calcium aluminate.

8. The method of claim 1, wherein the Young's modulus of the hardened cement is greater than the Young's modulus of the same hardened cement.

9. The method of claim 8, wherein the hardened cement has increased resiliency relative to the same hardened cement, wherein the resiliency is determined as the reduction in the ratio of the Young's modulus to the compressive strength.

10. The method of claim 9, wherein the ratio of the Young's modulus to the compressive strength of the hardened cement is reduced by at least 10% relative to the ratio of the Young's modulus to the compressive strength of the same hardened cement.

11. The method of claim 1, wherein the nanosheets comprise greater than 90 weight percent carbon.

12. The method of claim 1, wherein the BRG is produced by:
    combining a renewable carbohydrate material with a solvent to aid hydrolysis;
    removing glycosidic linkages and water via chemical activation, thermal activation, or both to provide an intermediate fused carbon material;
    thermochemically activating the intermediate fused carbon material to exfoliate intercalated carbon layers of the intermediate fused carbon material and to initiate chemical bonding of carbon atoms to form the BRG.

13. The method of claim 12, wherein the renewable carbohydrate material comprises yam root extract, potatoes root extract, cassava root extract, cassava root flour, tapioca flour, dried cassava root pulp, dried and fried cassava root flakes, sugarcane extract, sugar beet root extract, sucrose, rice grain, corn, wheat grain, or a combination thereof.

14. The method of claim 12, wherein the solvent to aid hydrolysis comprises water, ethylene glycol, ethanol, or a combination thereof.

15. The method of claim 12, wherein the chemical activation comprises activation with sodium hydroxide, hydrochloric acid, phosphoric acid, phosphorous acid, nitric acid, or a combination thereof.

16. The method of claim 12, wherein the removing of glycosidic linkages is effected in the presence of a catalyst selected from yeast, aluminum-nickel alloy, cobalt, $B_2H_6$, zinc, copper, or a combination thereof.

17. The method of claim 12, wherein the removing of glycosidic linkages comprises exposing a mixture of the renewable carbohydrate material, a chemical, and optionally a catalyst to a temperature in a range of from 45° C. to 1050° C., in air or inert atmosphere to aid formation of the intermediate fused carbon material, wherein the intermediate fused carbon material comprises a fused carbon network with a sheet-like morphology.

18. The method of claim 12, wherein the thermochemically activating comprises heating to a temperature in a range of from 500 to 1500° C., in an inert gas containing hydrogen gas.

19. The method of claim 18, wherein the thermochemically activating further comprises treating the intermediate fused carbon product with a chemical selected from hydrazine, $LiAlH_4$, $B_2H_6$, $NaBH_4$, or a combination thereof.

20. The method of claim 12, wherein the thermochemically activating comprises direct heating of the intermediate fused carbon material to exfoliate and remove water from the intermediate fused carbon material to form the BRG.

* * * * *